United States Patent
Ito et al.

(10) Patent No.: US 7,854,475 B2
(45) Date of Patent: Dec. 21, 2010

(54) SLIDING ROOF

(75) Inventors: Yoshiyasu Ito, Tochigi (JP); Hiroyuki Tsukamoto, Tochigi (JP); Kouichi Hotta, Tochigi (JP); Michio Tamura, Saitama (JP)

(73) Assignees: Yachiyo Industry Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 12/270,423

(22) Filed: Nov. 13, 2008

(65) Prior Publication Data

US 2009/0127890 A1 May 21, 2009

(30) Foreign Application Priority Data

Nov. 15, 2007 (JP) ............................. 2007-296244

(51) Int. Cl.
*B60J 7/047* (2006.01)
*B60J 7/057* (2006.01)
(52) U.S. Cl. .............. 296/216.02; 296/223; 296/216.03
(58) Field of Classification Search ........... 296/216.02, 296/216.03, 221, 223, 224
See application file for complete search history.

(56) References Cited

U.S. PATENT DOCUMENTS

| 4,730,868 A * | 3/1988 | Niwa ...................... 296/216.03 |
| 6,296,302 B1 * | 10/2001 | Martinus Lenkens .. 296/220.01 |
| 6,428,091 B2 * | 8/2002 | Ito et al. ..................... 296/221 |
| 6,729,684 B2 * | 5/2004 | Arnold et al. ............... 296/223 |

FOREIGN PATENT DOCUMENTS

| JP | 03-109123 A | 5/1991 |
| JP | 2001-199244 A | 7/2001 |
| JP | 2005-153859 A | 6/2005 |

* cited by examiner

*Primary Examiner*—Dennis H Pedder
(74) *Attorney, Agent, or Firm*—Arent Fox LLP (57) ABSTRACT

The present invention provides a sliding roof for a vehicle including a plurality of roof panels separately mounted on an opening of a fixed roof of the vehicle in a longitudinal direction of the vehicle, a guide frame attached at a lower portion of each side edge of the opening, and an anchor installed into the guide frame to engage with at least part of the roof panel, so as to assist open-close operations of the plurality of the roof panels in the vicinity of a closed state thereof. Sliding of sliders attached to the each guide frame allows the plurality of the roof panels to open or close in the longitudinal direction of a vehicle. The sliding roof for a vehicle further includes a guide member installed into the guide frame to guide a movement of engagement portions of the plurality of the roof panels adjacent in the longitudinal direction of the vehicle. The anchor and the guide member are installed into an identical groove formed on the guide frame.

3 Claims, 8 Drawing Sheets

SLIDING ROOF

CROSS-REFERENCE TO RELATED APPLICATION

This application claims the foreign priority benefit under 35 U.S.C. §119 of Japanese Patent Application No. 2007-296244 filed on Nov. 15, 2007, the disclosure of which is incorporated herein by reference.

BACKGROUND OF THE INVENTION

1. Field of the Invention

The present invention relates to a sliding roof for a vehicle, in particular to an anchor installation structure for a sliding roof for a vehicle.

2. Description of the Related Art

For a conventional sliding roof for a vehicle, there are provided a roof panel that is installed to an opening of a fixed roof, a slider that is installed on the roof panel to slide in the longitudinal direction of the vehicle, thereby to open or close the roof panel in the longitudinal direction, and a guide frame to guide a sliding operation of the slider.

Figure 9A:
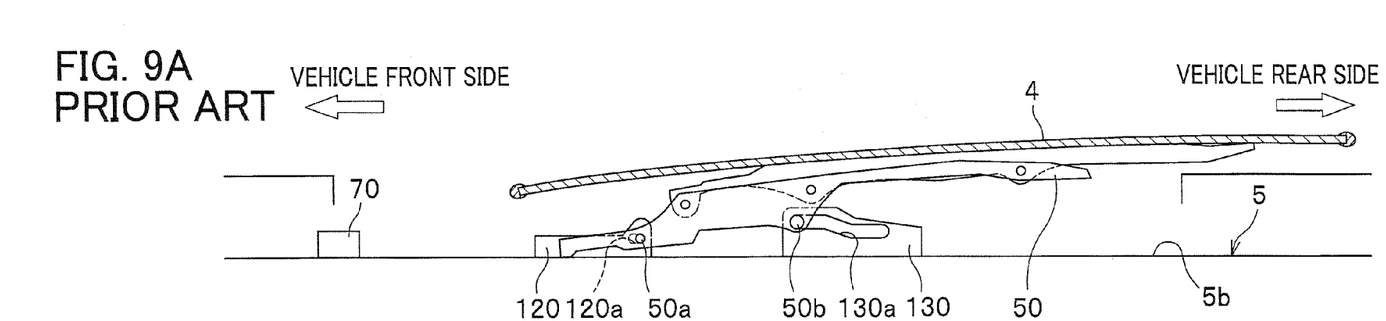
FIG. 9A is a sectional side view showing a roof panel that is slid on the vehicle rear side.

In such a conventional sliding roof system, an open or close operation is carried out such that: as shown in FIG. 9A, a front slider 120 and a driving slider 130, which slide along a guide rail groove 5b of a guide frame 5 in the longitudinal direction of the vehicle, are installed to a panel stay 50 that is attached onto a lower face at the side edge of the roof panel 4. The front slider 120 and the driving slider 130 are provided with cam grooves 120a, 130a, respectively. The panel stay 50 is provided with engagement pins 50a, 50b, respectively, which engage with the respective cam grooves 120a, 130a.

A cable for a push-pull operation is connected at one end thereof to the driving sliders 130, and this push-pull operation of the cable allows the driving slider 130 to slide. The front slider 120 slides, moving along with the above sliding of the driving slider 130.

Figure 9B:
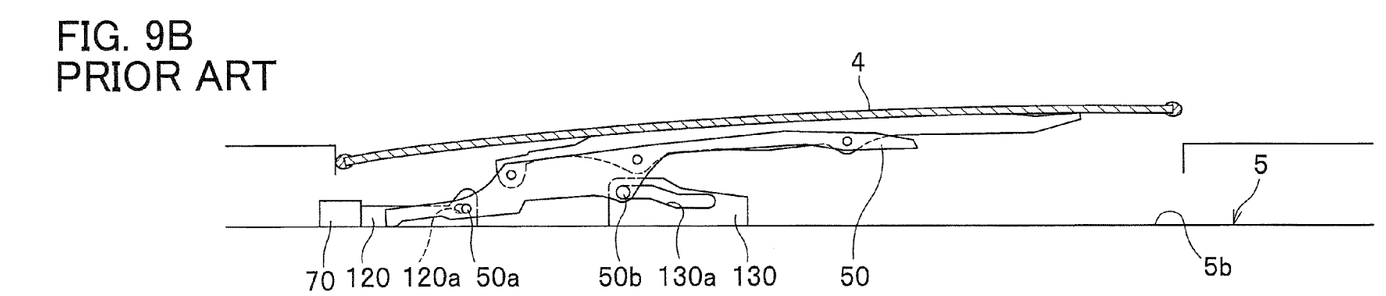
FIG. 9B is a sectional side view showing the roof panel that is tilted up.
Figure 9C:
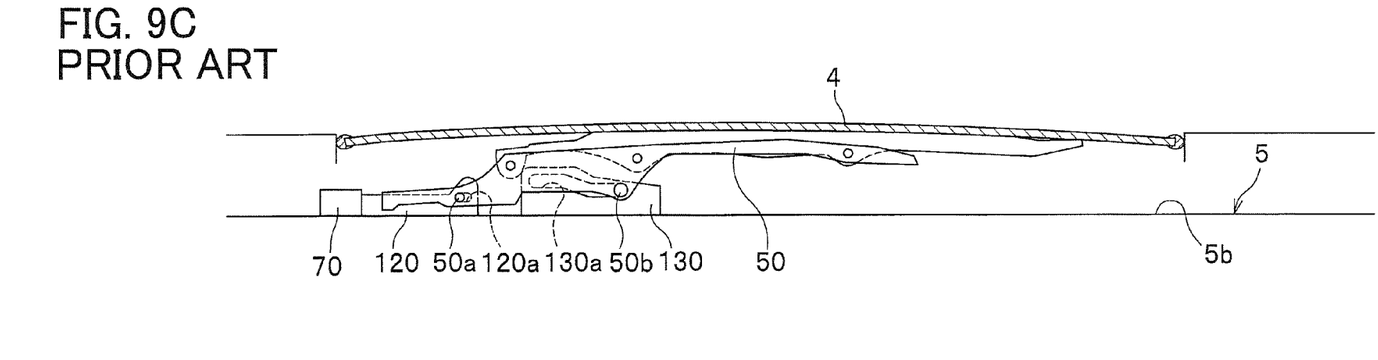
FIG. 9C is a sectional side view showing the roof panel that is completely closed.

From an state of the roof panel 4 in which the roof panel 4 is tilted-up and stays on the rear vehicle side as shown in FIG. 9A, the driving slider 130 slides toward the vehicle front side as shown in FIG. 9B, working along with the driving slider 130, and then the front slider 120 abuts a stopper 70 provided at the front end of the guide rail groove 5b, so as to stop at the stopper 70. From this state, the driving slider 130 further slides toward the vehicle front side, the respective engagement pins 50a, 50b of the panel stay 50 move in the respective cam grooves 120a, 130a of the front slider 120 and the driving slider 130, so that the panel stay 50 descends at the rear portion thereof, and tiltingly moves so that the roof panel 4 is tilted down into a full-closed state.

In such an prior art, there have been problems regarding water-proof property between the movable roof panel and its opening, preventions of wind-whistling and wind-rattling sounds, which are likely to occur when the roof panel tilts up or down. To solve these problems, a means for reducing displacement of the roof panel in the longitudinal direction, which is one of possible causes of these disadvantages, is disclosed in JP 2001-199244A (Paragraphs 0003 to 0007, FIGS. 2 to 5).

In such a sliding roof system in which the roof panel performing an tilting operation, as disclosed in JP 2001-199244A, when the roof panel is in a tilt-up state during the vehicle driving, a lower pressure is created at the upper portion, and air-swirling is occurred at the rear side end of the roof panel, so that force pushes the roof panel upward occurs. This force due to the negative pressure and the air-swirling become greater as the vehicle speed is increased. Thus, when the roof panel is tilted down, particularly when being tilted into a complete closed state, a greater operational load is required to oppose the above-mentioned forces. To counter such a problem, a control scheme to change the operational load is disclosed in JP 2005-153859 A (Claim 1, Paragraphs 0003, 0014, FIG. 1), or JPH03-109123 A (FIG. 3) discloses that a member called as an anchor is installed to the sliding roof system in order to distribute the load onto the roof panel.

Recently, for the purpose of securing an increased opening area of a sliding roof, there have been provided more sliding roofs, having a plurality of roof panels on a fixed roof opening of a vehicle. These roof panels are separately disposed in the lateral direction of the vehicle, with a mechanism to open or close these roof panels. For example, such a sliding roof system includes a twin-panel type sliding roof having two roof panels. Such a sliding roof system having plural roof panels requires a complicated mechanism to move these panels, thus many grooves are provided on each guide rail of the sliding roof, which serve as a moving mechanism.

The anchors of the above-mentioned prior art are required to be separately installed to a vehicle body or guide rails of the vehicle.

The present invention has an object to provide a sliding roof having an anchor installation structure that is suitable for a sliding roof with a plurality of roof panels, and facilitates installing an anchor into a groove of each guide rail with requiring no additional preparations on components to which the anchor is installed.

SUMMARY OF THE INVENTION

In one aspect of the present invention, there is provided a sliding roof for a vehicle including a plurality of roof panels separately mounted on an opening of a fixed roof of the vehicle in a longitudinal direction of the vehicle, a guide frame attached at a lower portion of each side edge of the opening, and an anchor installed into the guide frame to engage with at least part of the roof panel, so as to assist open-close operations of the plurality of the roof panels in the vicinity of a closed state thereof. Sliding of sliders attached to the each guide frame allows the plurality of the roof panels to open or close in the longitudinal direction of a vehicle. The sliding roof for a vehicle further includes a guide member installed into the guide frame to guide a movement of engagement portions of the plurality of the roof panels adjacent in the longitudinal direction of the vehicle. The anchor and the guide member are installed in pair into an identical groove formed on the guide frame.

Other features and advantages of the present invention will become more apparent from the following detailed description of the invention when taken in conjunction with the accompanying exemplary drawings.

BRIEF DESCRIPTION OF THE DRAWINGS

FIGS. 4A to 4C are views for explaining open-close operations of the roof panel of a sliding roof system according to the embodiment of the present invention.

FIGS. 9A to 9C are views of a stopper structure of a conventional sliding roof system.

DETAILED DESCRIPTION OF THE PREFERRED EMBODIMENTS

With reference to attached drawings, descriptions will be provided on one embodiment of the present invention.

The present embodiment exemplifies a case of applying the present invention to a roof of a vehicle (e.g. motor vehicle). Hereinafter, outlines will be provided on a twin-panel type sliding roof system as a minimum unit of a sliding roof system for a vehicle having a plurality of roof panels, and then descriptions will be provided on an anchor installation structure on the sliding roof system.

<Sliding Roof System>

Figure 1:
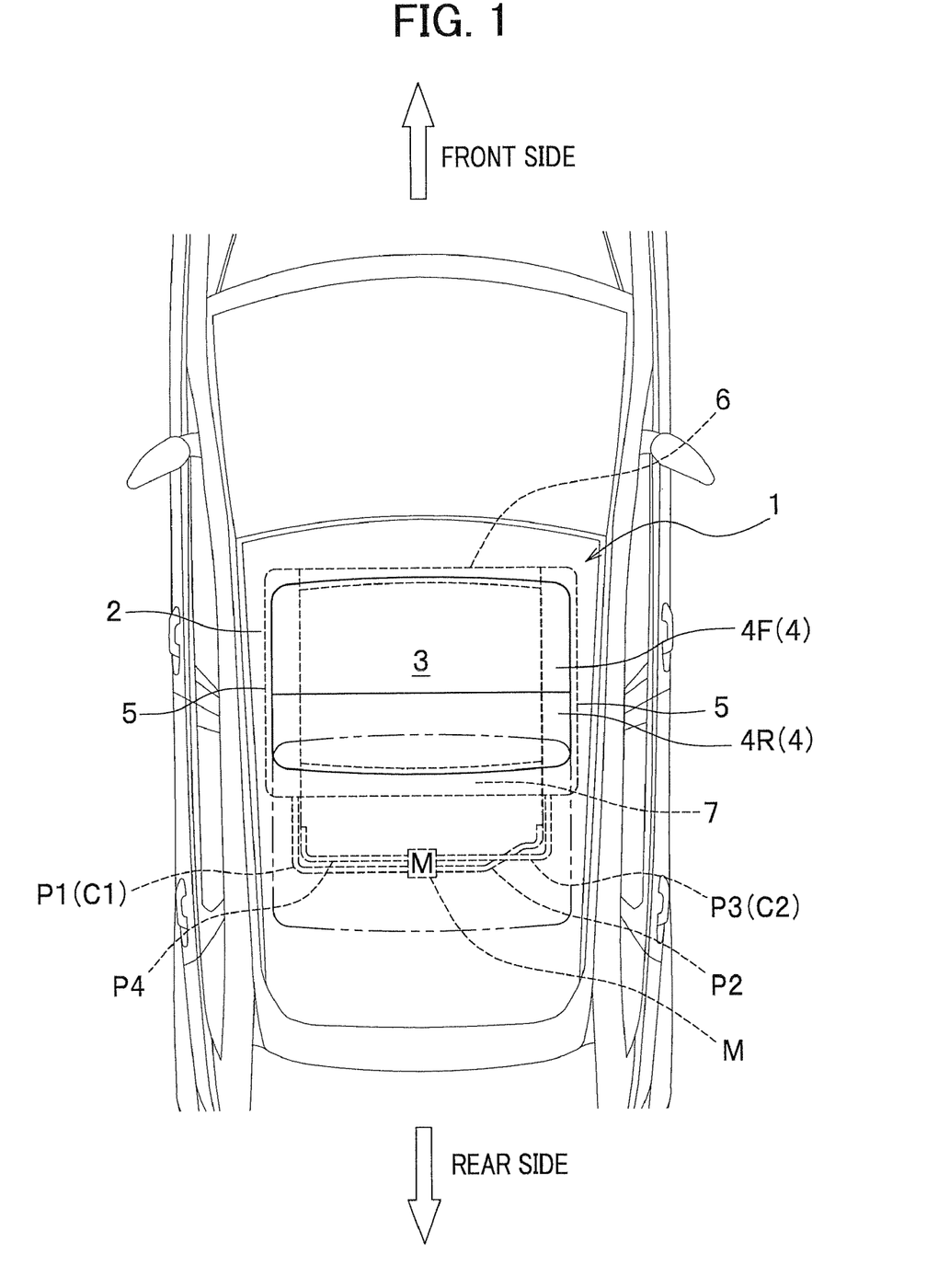
FIG. 1 is a plane view of the sliding roof system according to an embodiment of the present invention.

FIG. 1 is a plane view of the sliding roof system according to the present embodiment of the present invention.

The sliding roof system 1 of the present embodiment, as shown in FIG. 1, is a twin panel type sliding roof system, including a front roof panel 4F and a rear roof panel 4R constituting a roof panel 4, sliders (not shown) that are mounted to the roof panel 4 to slide in the longitudinal direction of the vehicle, thereby to open or close the roof panel 4 in the longitudinal direction, a pair of cables C1 and C2 that are connected to the sliders and provide an push-pull operation, thereby to open or close the roof panel 4, and guide frames 5, 5 that guide the sliding operation of the sliders.

<Roof Panel>

The roof panel 4 in FIG. 1 is made of glass, and is designed to close the opening 3 of the fixed roof 2 when in a closed state; and tilts up the front panel roof 4F and tilts down the rear roof panel 4R by a tilt-slide mechanism (described later), and then slides both the front and rear roof panels 4F, 4R toward the vehicle rear side so that the front and rear roof panels 4F, 4R are stacked on the upper side and the lower side of the fixed rood 2, respectively, when in a open state.

The pair of cables C1, C2 are installed via the tilt-slide mechanism on the respective side edges of the roof panel 4. The cables C1 and C2 synchronously perform their push-pull operations to secure an open-close operation of the roof panel 4 in a stable posture.

Hereinafter, descriptions will be provided on the tilt-slide mechanism of the front roof panel 4F.

<Guide Frames>

Figure 2:
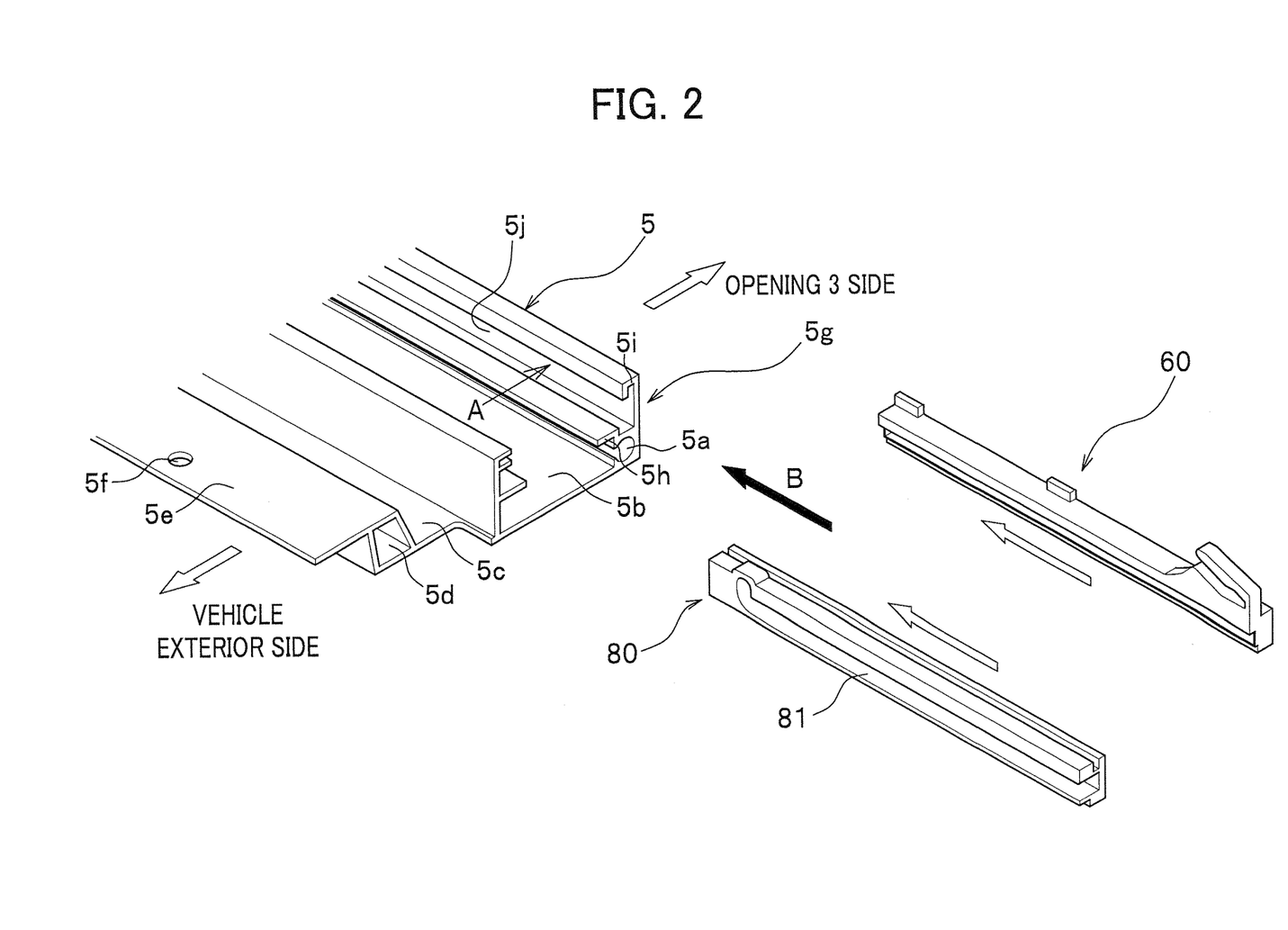
FIG. 2 is an explored perspective view showing an anchor and a guide member as components of a guide frame according to the present embodiment of the present invention.

FIG. 2 is a partial perspective view showing the vicinity of an end face of a guide frame, an anchor and a guide member of the front panel 4F according to the present embodiment.

In the sliding roof system 1 of the present embodiment, as shown in FIG. 1, a pair of the guide frames 5, 5 extending in the longitudinal direction of the vehicle are attached at the lower portions of the side edges of the opening 3, for example. A front frame 6 that connects the frond ends of the guide frames 5, 5 to each other is provided on the lower portion of the front edge of the opening 3, and a rear frame 7 that connects the rear ends of the guide frames 5, 5 to each other is also provided on the lower portion of the rear edge of the opening 3.

In the sliding roof system 1 of the present embodiment, each guide frame 5 has an identical structure, therefore, descriptions will be provided only on the guide frame 5 on the left side relative to the vehicle traveling direction, and descriptions on that on the right side will be omitted.

The guide frame 5, for example, is formed of a member made of extruded aluminum alloy material. The guide frame 5, in the order from the opening 3 side to the vehicle exterior side, includes a cable groove 5a into which the cable C1 is inserted, a guide rail groove 5b that guides a sliding movement of the sliders (i.e. a front slider 20 and a driving slider 30) of the tilt-slide mechanism (described later), and a drain groove 5c are extendedly provided along the longitudinal direction of the vehicle, whereby stiffness of the guide frame is enhanced.

At the upper side end of the guide frame 5 on the vehicle exterior side, there is extendedly provided a horizontal flange 5e. There are provided through holes 5f on the flange 5e that correspond to respective screw holes provided on the vehicle body (not shown). A bolt is inserted through the through hole 5f from the upper face of the flange 5e and is screwed through the screw hole on the vehicle body, so that the guide frame 5 is fixed to the vehicle body.

In order to form the above-mentioned guide rail groove 5b, a threshold wall 5h is extendedly provided in the longitudinal direction of the vehicle on the inner face in the left-right reversal C-shaped cross sectional face of the side end 5g on the opening 3 side of the guide frame 5. On the upper edge of this side end 5g, there is provided an overhang portion 5i for enhancing stiffness of the guide frame 5. Similarly, there are provided protruding walls, which have roughly the same structures as those of the threshold wall 5h and the overhang portion 5i, on the inner face of the side end, opposite to the side end 5g, on the vehicle exterior side of the guide rail groove 5b.

Between the threshold wall 5h and the overhang portion 5i, the anchor 60 and the guide member 80 (described later) are installed. The threshold wall 5h and the overhang portion 5i are together formed in an up-side-down hook-shape, protruding toward each other. The anchor 60 and the guide member 80, in this order, are installed into the up-side-down hook-shaped groove 5j (indicated by Arrow A) formed by the threshold wall 5h and the overhang portion 5i from the vehicle rear side (black bold Arrow B direction). The groove 5j has an opening narrower than the inner space thereof; hence, the anchor 60 and the guide member 80, once inserted into the groove 5j, are prevented from moving in any directions other than in the longitudinal direction of the guide frame 5.

In this way, since the anchor 60 and the guide member 80 are installed into the identical grooves 5j, a stable movement locus of the front roof panel 4F and the rear roof panel 4R adjacent to each other is secured to smoothen the movement thereof.

Figure 3:
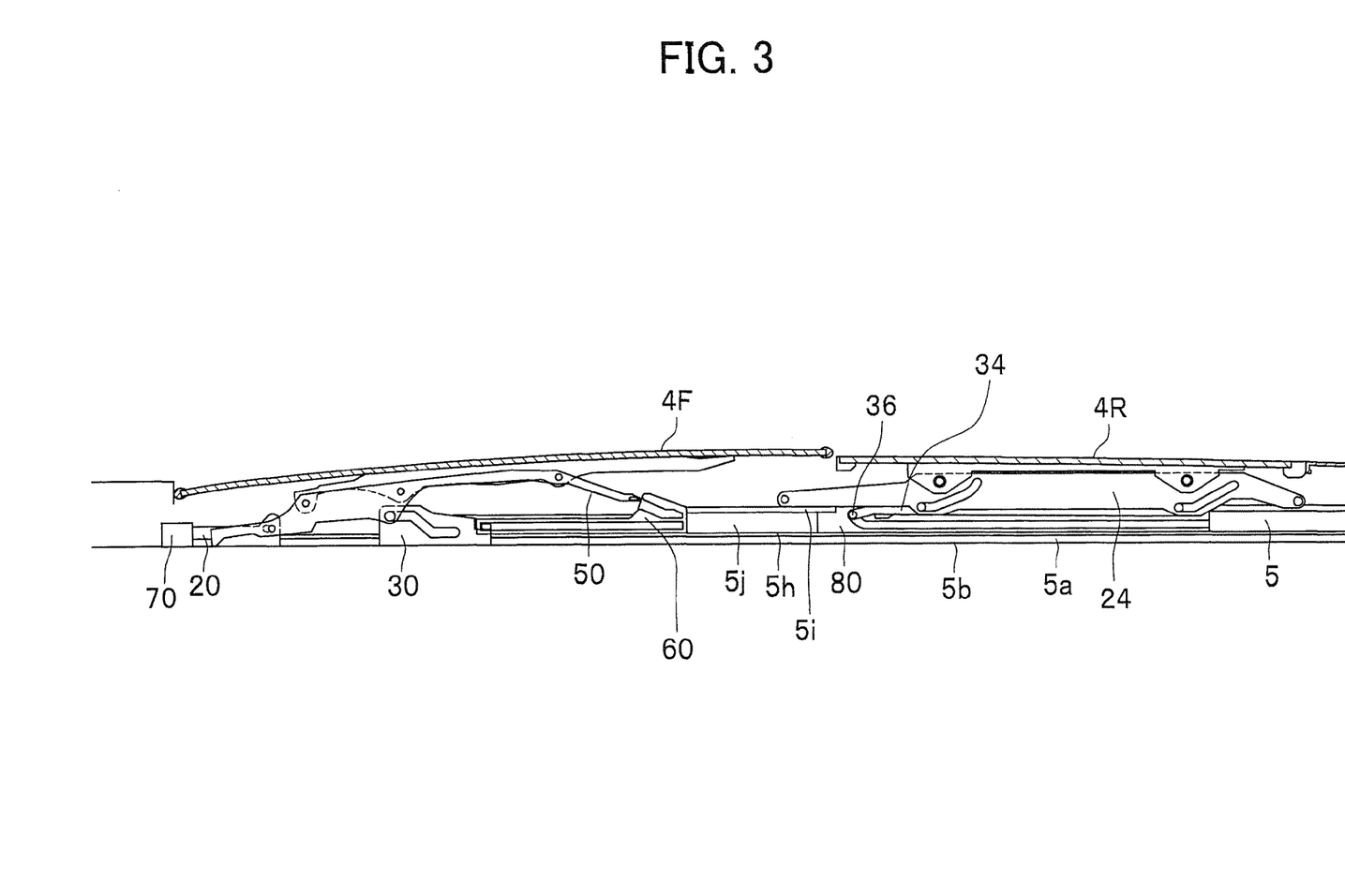
FIG. 3 is a sectional side elevation view showing an installation status of the anchor and the guide member into a groove of the guide frame.

FIG. 3 is a sectional side elevation view showing an installation state of the anchor 60 and the guide member 80 into the groove 5j. As mentioned above, the anchor 60 is installed into the groove 5j on the front roof panel 4F side, and the guide member 80 is installed into the groove 5j on the rear roof panel 4R side.

Hereinafter, short descriptions on the anchor 60 and the guide member 80 will be provided with reference to FIG. 3, and detailed descriptions thereon will be provided later.

The anchor 60 usually stays in engagement with a boss 31 provided at the end portion of the driving slider 30 on the vehicle rear side, so that the anchor 60 can be engaged with the panel stay 50 (described later) when the front roof panel 4F comes into a closed or almost closed state. The panel stay 50, as described later in <Anchor Engagement>, comes in engagement with the anchor 60 through the front slider 20, the driving slider 30 and a cam mechanism using cam grooves formed on the sliders 20 and 30; and the movement of the front roof panel 4F toward the vehicle front side is limited by the stopper 70. FIG. 3 shows a state of the front roof panel 4F tilting up slightly. Next, further to the anchor 60, the guide member 80 is also installed into the identical groove 5j of the guide frame 5, as mentioned above. A guide pin 36 is projectedly provided on a lifter 34 that synchronizes the opening-closing operations between the front roof panel 4F (driving slider 30) and the rear roof panel 4R (panel support stay 24), and the guide pin 36 is engaged with a guide groove 81 of the guide member 80 (see FIG. 2).

<Cables>

The cables C1, C2 in FIG. 1 are installed to the respective side edges of the front roof panel 4F via the tilt-slide mechanism (described later), and perform their push-pull operations in a synchronous manner to open or close the front roof panel 4F.

The cables C1, C2 are communicated with a driving motor unit M provided on the rear position of the opening 3, and the cables C1, C2 are engaged with pinion gears within the driving motor unit M (not shown) so that the cables C1 and C2 perform a pull-push driving.

On the border of the driving motor unit M, the cable C1 that is installed on a passage on one side edge (left side of FIG. 1) of the front roof panel 4F (drive passage) is inserted into a guide pipe P1 for guiding the cable C1, and the rest of the cable C1 on a passage on the opposed side (idling passage) of the one side edge is inserted into the guide pipe P2. Similarly, on the border of the driving motor unit M, the cable C2 that is installed on a passage on the other side edge (right side of FIG. 1) of the front roof panel 4F (drive passage) is inserted into a guide pipe P3 for guiding the cable C2, and the rest of the cable C2 on a passage on the opposed side (idling passage) of the other side edge is inserted into the guide pipe P4. These guide pipes P1, P2, P3, P4 are formed of a aluminum or steel tube, respectively, for example.

<Tilt-Slide Mechanism>

Figure 4A:
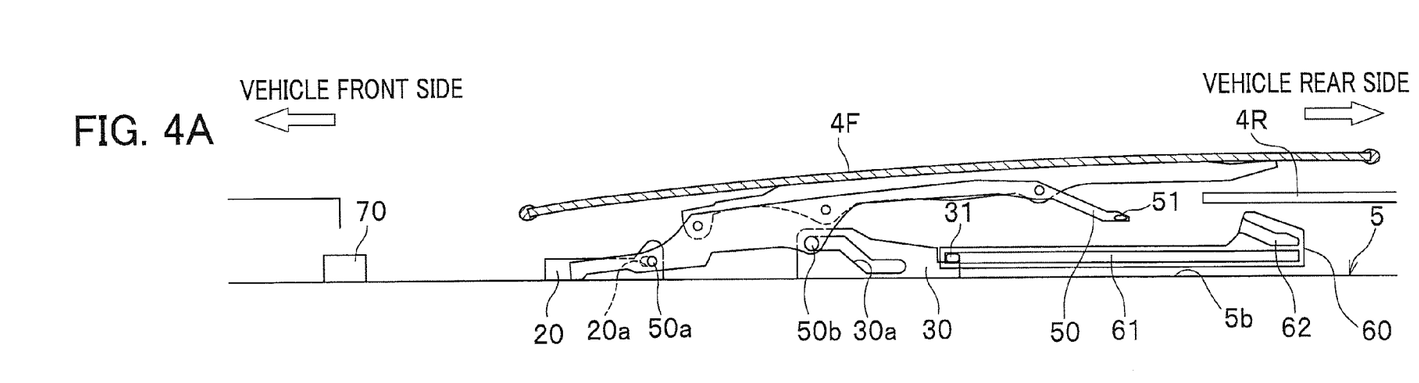
FIG. 4A is a sectional side view showing a roof panel that is slid on the vehicle rear side.
Figure 4B:
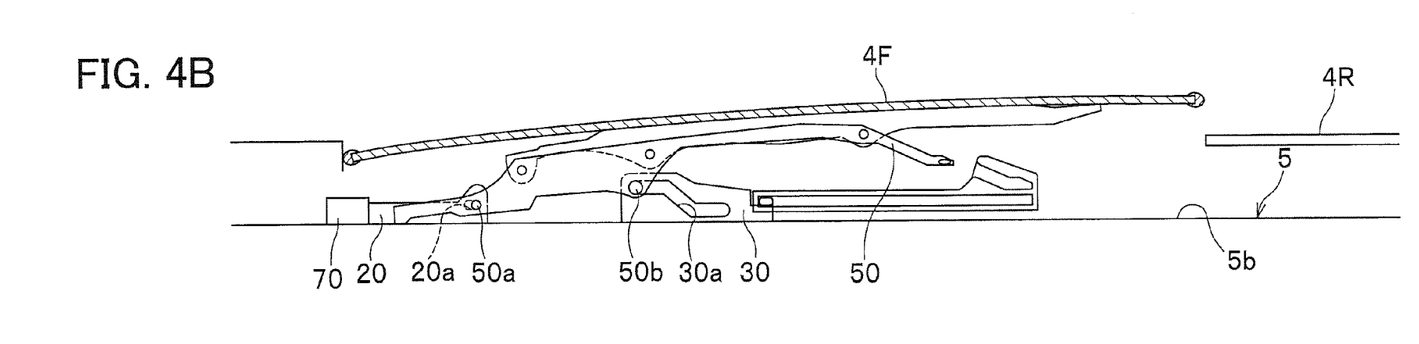
FIG. 4B is a sectional side view showing the roof panel that is tilted up.
Figure 4C:
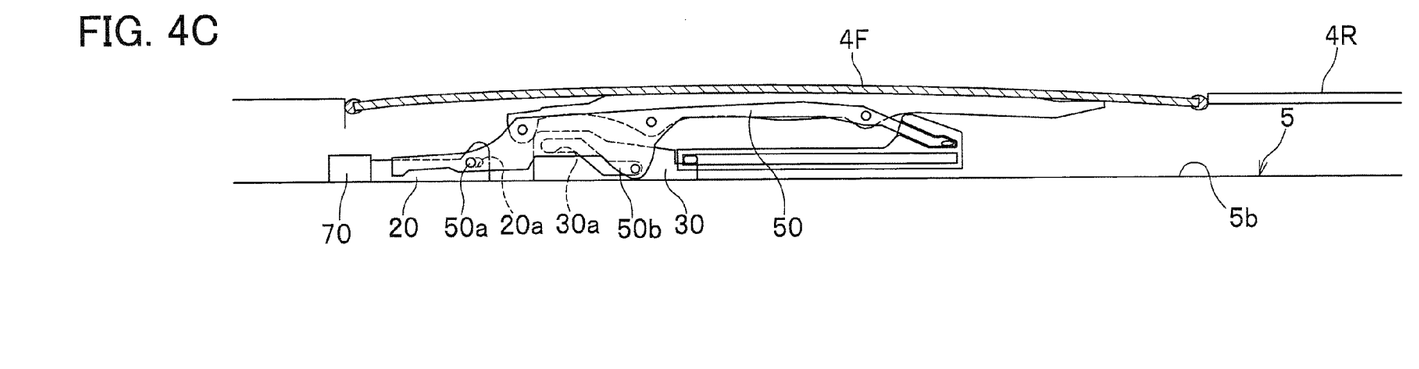
FIG. 4C is a sectional side view showing the roof panel that is completely closed.

FIGS. 4A to 4C are views for explaining the open-close operations of the roof panel 4 of the sliding roof system 10: FIG. 4A is a sectional side view showing the front roof panel 4F that is slid on the vehicle rear side; FIG. 4B is a sectional side view showing the front roof panel 4F that is tilted up; and FIG. 4C is a sectional side view showing the front roof panel 4F that is completely closed. In FIGS. 4A to 4C, the guide frame 5 and other components are omitted to simplify the explanations.

The sliding roof system 1 of the present embodiment of FIG. 1 includes the tilt-slide mechanisms of the front roof panel 4F serving as tilt and slide mechanisms, and the tilt-slide mechanisms are installed in the respective guide frames 5, 5. As shown in FIG. 4A, the tilt-slide mechanism includes the panel stay 50 mounted to the front roof panel 4F, the front slider 20 and the driving slider 30 that are installed on the front lower side and the rear lower side of the panel stay 50, respectively, to slide in the longitudinal direction of the vehicle along the guide rail groove 5b of the guide frame 5, and the coupling link 40 that is installed to the front slider 20, detachably coupling with the driving slider 30

Note that the tilt-slide mechanisms installed in the guide frames 5, 5 have an identical configuration, therefore, descriptions will be provided only on the tilt-slide mechanism on the vehicle left side relative to the traveling direction, and descriptions on the tilt-slide mechanism on the right side will be omitted.

Cam grooves 20a, 30a are formed on the front slier 20 and the driving slider 30, respectively, and engagement pins 50a, 50b that engage with the respective cam grooves 20a, 30a, are formed on the panel stay 50. The panel stay 50 is attached onto the lower face of the side edge of the front roof panel 4F through panel support brackets (not shown).

One end of the cable 1 (see FIG. 1) for the pull-push operation is connected to the driving slider 30, and the pull-push operation of the cable 1 allows the driving slider 30 to slide along the guide rail groove 5b in the longitudinal direction of the vehicle. The front slider 20 coupled with the driving slider 30 via the panel stay 50 and the coupling link 40 also slides in the longitudinal direction of the vehicle, working in cooperation with the sliding of the driving slider 30.

Detailed descriptions will be provided on the open-close operations of the front roof panel 4F performed by the tilt-slide mechanism.

FIG. 4A shows the front roof panel 4F in an open state where the front roof panel 4F is tilted up and located on the vehicle rear side, so that the front roof panel 4F at the rear side are partially over the rear roof panel 4R (see FIG. 1). When the driving slider 30 is slid toward the vehicle front side by the cable 1, the front slider 20 and the front roof panel 4F, coupled with the driving slider 30 through the panel stay 50, are also slid toward the vehicle front side, moving along with the sliding movement of the driving slider 30, and then the front slider 20 stops at the stopper 70 that is provided at the front end of the guide rail groove 5b, as shown in FIG. 4B.

From this state, when the driving slider 30 further moves toward the vehicle front side, the engagement pins 50a, 50b of the panel stay 50 move along the cam grooves 20a, 30a of the front slider 20 and the driving slider 30, respectively, whereby the rear position of the panel stay 50 tiltingly moves downward. Accordingly, as shown in FIG. 4C, the front roof panel 4F is tilted down into a full-closed state, so that the opening 3 (see FIG. 1) is completely closed.

The boss 31 is provided at the end portion of the driving slider 30 on the vehicle rear side, and the boss 31 is in engagement with the recessed portion 61 formed on the side face of the anchor 60 along the longitudinal direction thereof.

<Anchor>

Figure 5:
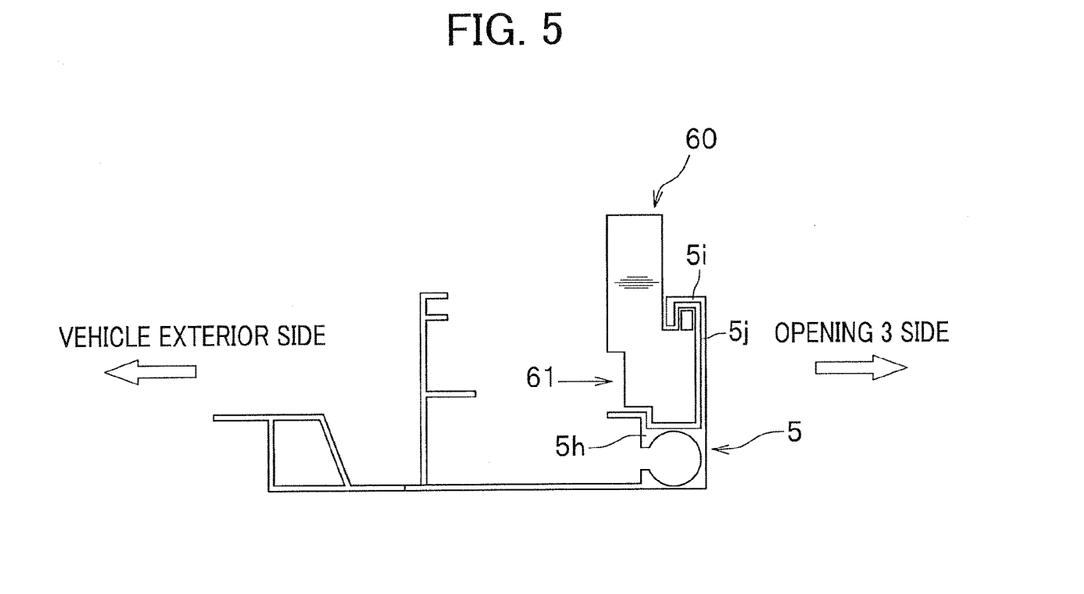
FIG. 5 is a view for explaining how the anchor according to the embodiment of the present invention has been installed.

With reference to FIGS. 2, 4, 5, descriptions will be provided on the structure of the anchor 60 and how the anchor 60 is installed. FIG. 5 is a view for explaining the anchor 60 installed in the guide rail 5, viewed from the black bold Arrow B (from the vehicle rear side) of FIG. 2.

When a greater load is applied onto the front roof panel 4F, the anchor 60 serves for distributing this greater load. In a state where the recessed portion 61 (see FIG. 4) formed on the side face of the anchor 60 opens toward the vehicle exterior side, the anchor 60 is installed into the up-side-down hook-shaped groove 5j between the overhang portion 5i and the threshold wall 5h that are extendedly provided in the longitudinal direction of the vehicle on the inner face in the left-right reversal C-shaped cross sectional face of the side end 5g on the opening 3 side of the guide frame 5. In this way, the anchor 60 is in contact with the guide frame 5 on the three sides, except on the opening side of the recessed portion 61.

Resin material such as POM (polyacetal) may be applicable to the anchor 60. Such an installation of the anchor 60 of resin into the groove 5j formed by the overhang portion 5i and the threshold wall 5h of the metal guide frame 5 provides sort of a damper effect to reduce oscillation of the guide frame 5, as well as enhancement of the stiffness against a loads of bending, twisting or shearing.

When the state of the front roof panel 4F shifts from FIG. 4B to FIG. 4C while the vehicle is driving, the pressure of the vehicle interior becomes higher than the pressure on the outer surface of the vehicle due to the pressure gradient caused by air flow on the outer surface of the vehicle. Therefore, the air flows from the vehicle interior toward the vehicle exterior through the opening of the fixed roof. At this time, since force caused by the differential pressure over the entire roof panel goes upward, resistance against the closing operation to tilt down the roof panel becomes greater. Therefore, the anchor 60 is installed to serve for reducing such resistance against the closing operation in such a manner; when the state of the front roof panel 4F shifts from FIG. 4B to FIG. 4C, a stay boss 51 comes in engagement with a cam groove 62 formed on an side end face of the anchor 60 on the vehicle rear side, of which opening 63 is disposed on the vehicle front side (see FIG. 6), whereby the anchor 60 receives part of the force pushing the front roof panel 4F upward, resulting in providing load distribution (i.e. load assist).

The anchor 60 is installed into the guide frame 5, as mentioned above, and comes in contact with the guide frame 5 in the longitudinal direction of the vehicle and in the three directions, except on the opening side of the recessed portion 61, thereby to counter load applied from an irregular load direction due to variations of the wind-blowing direction during the vehicle driving. According to the present embodiment, the anchor 60 is in contact with the guide frame 5 in broader area, thereby to prevent load concentration onto a specific part of the guide frame 5. The anchor 60 moves in the guide frame 5 in the longitudinal direction of the vehicle, thereby to release part of the load, resulting in reduction of the load level.

<Anchor Engagement>

Figure 6:
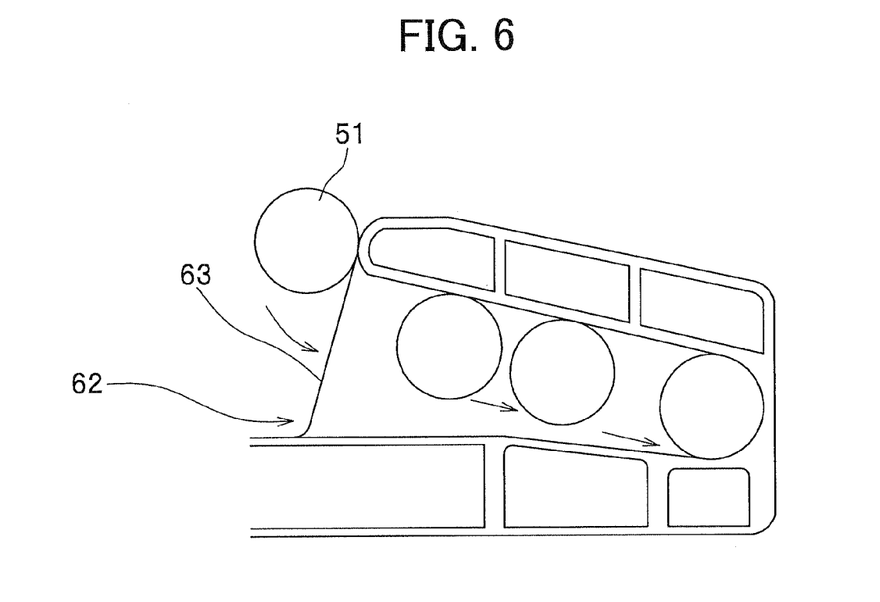
FIG. 6 is an enlarged view for explaining an engaging portion between a stay boss and a cam groove.

With reference to FIGS. 4 and 6, descriptions will be provided on how the anchor 60 comes in engagement with the panel stay 50, hereinafter. FIG. 6 is an enlarged cross sectional view for explaining the engagement between the stay boss 51 and the cam groove 62. In order to tilt down the front roof panel 4F, the rear end of the panel stay 50 on the vehicle rear side descends. At this time, the anchor 60 that has been engaged with the driving slider 30, through the engagement between the boss 31 and the recessed portion 61, moves forward along with the movement of the driving slider 30, and then the stay boss 51 at the rear end of the panel stay 50 comes in contact with the upper slope face of the opening 63 of the cam groove 62. Then, the stay boss 51 goes downward along the cam groove 62 into the anchor 60.

While the stay boss 51 is moving along the cam groove 62, the front roof panel 4F is gradually tilted down into the closed state; hence, the opening area through which the air is suctioned from the interior to the exterior of the vehicle becomes smaller. As the opening area becomes smaller, the speed of the air flow through the smaller opening area becomes higher, and the local pressure difference becomes greater, pushing the front roof panel 4F upward. However, against this increased force pushing the front roof panel 4F upward, these three points, i.e., 1) the anchor 60 engaged with the panel stay 50, and 2) the driving slider 30 as well as 3) the front slider 20 respectively engaged with the anchor 60, distribute the applied load to the front, middle and rear sides of the panel stay 50 in the longitudinal direction of the vehicle, resulting in reducing a load onto each point.

Constituted as such, irregular load onto the panel stay 50 can be prevented more effectively than in a conventional case of supporting the load on two points of the driving slider 30 and the front slider 20; thus, the posture of the panel stay 50 is so stable that the movement of the driving slider 30 toward the vehicle front side becomes smoother and easier. Finally, as shown in FIG. 4C, the front roof panel 4F is tilted down into a closed state, reducing the displacement of the front roof panel 4F in the longitudinal direction of the vehicle.

Similarly, when the state of the front roof panel 4F reversely shifts from FIG. 4C to FIG. 4A, and the front roof panel 4F starts being tilted up, the air is suctioned from the vehicle interior through the opening toward the vehicle exterior because of the pressure difference between the interior and exterior of the vehicle, due to the pressure gradient caused by air flow on the outer surface of the vehicle. Hence, load is applied onto the front roof panel 4F to be pushed upward, which may cause an abrupt opening operation. However, even in such a situation, the anchor 60 according to the present embodiment stabilizes the movement of the driving slider 30, and provides a stable opening operation by a secured tilt-up operation.

<Guide Member>

Figure 7:
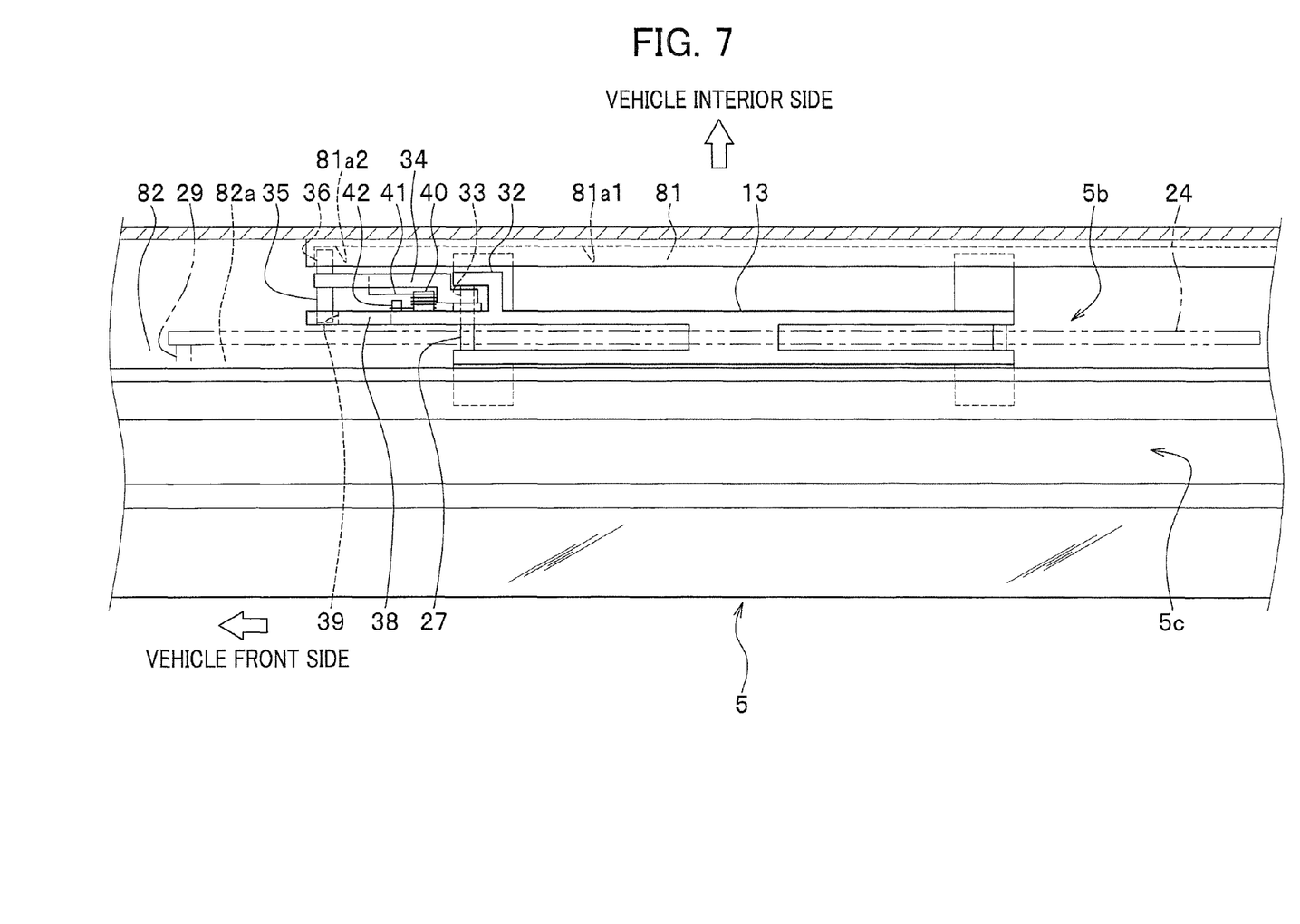
FIG. 7 is a plain view in the vicinity of an engaging-disengaging mechanism the left side, in according to the embodiment of the present invention.
Figure 8:
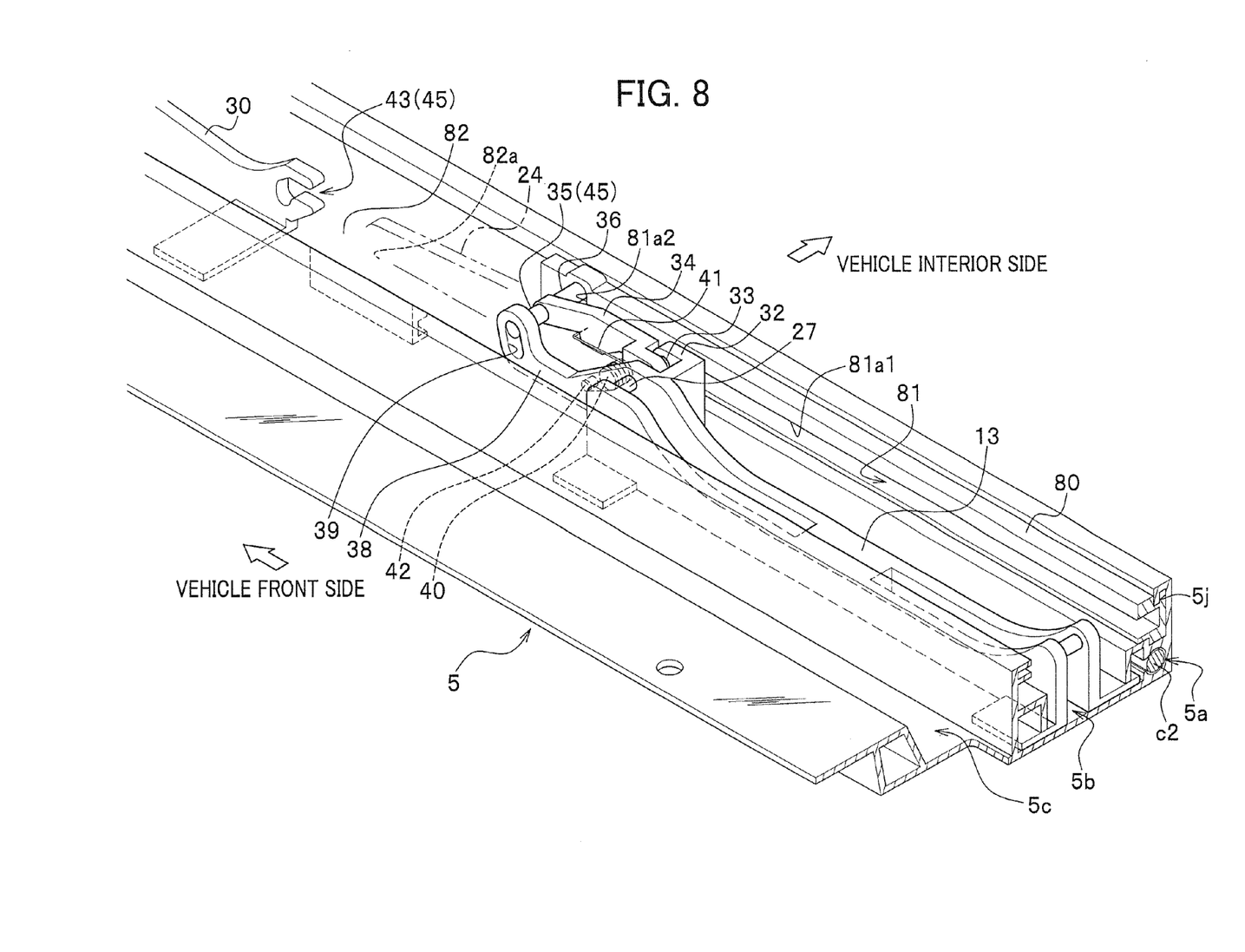
FIG. 8 is an outer perspective view in the vicinity of an engaging-disengaging mechanism in the guide frame on the left side.

With reference to FIGS. 2, 7, 8, descriptions will be provided on the structure of the guide member 80, and how the guide member 80 is installed. FIGS. 7 and 8 are a plain view and an outer perspective view showing the vicinity of an engaging-disengaging mechanism 45 in the guide frame 5 on the left side.

The guide member 80 is a long member for guiding the movement of the engagement portions of the front roof panel 4F and the rear roof panel 4R, and is installed into the groove 5j on the vehicle rear side, where the anchor 60 has already been inserted on the vehicle front side. The guide member 80 is provided with a guide groove 81 (see FIG. 2) that guides a guide pin 36 provided on a lifter 34 (described later) that synchronizes the open-close operations between the front roof panel 4F and the rear roof panel 4R.

Resin material such as POM (polyacetal) may be used for the guide member 80. By installing the guide member 80 of resin material between the overhang portion 5i and the threshold wall 5h of the guide frame 5 of metal, a sort of damper effect can be obtained to reduce vibrations of the guide frame 5, as well as enhancement of stiffness against load such as bending, twisting and shearing.

For the sake of explaining the operational effects by the guide member 80, with reference to FIGS. 8 and 7, descriptions will be provided on the engaging-disengaging mechanism 45 between an engaging-disengaging portion at the rear end of the driving slider 30 (i.e. engagement groove 43) and an engaging-disengaging portion at the front end of the rear panel slider 13 (i.e. engagement pin 35 of the lifter 34).

Note that, in the present embodiment, such an engaging-disengaging mechanism for providing engagement or disengagement between the engaging-disengaging portion on the rear end of the driving slider 30 and the engaging-disengaging portion on the front end of the rear panel slider 13 can effectively work in such a case of using a simple mechanism and structure to engage or disengage the sliders 30 and 13 to slide along a guide rail 5b having a limited closed space.

A horizontal pin is projectedly provided in the vicinity of the front end of the panel support stay 24. This pin constitutes a tilt rotation-center 29. A rotation-center guide member 82 having a rotation-center guide groove 82a extending downward is fixed to the guide rail groove 5b of the guide frame 5, and the tilt rotation-center 29 is engaged with the rotation-center guide groove 82a. The rear end of the rotation-center guide groove 82a opens so that the tilt rotation-center 29 can be detached toward the rear side of the vehicle.

On the side face of the rear panel slider 13 at the front portion of the vehicle interior side, there is projectedly provided an L shaped spin-axis support 32 in the plane view, and a spin-axis 33 of a pin is installed horizontally between the side face and the spin-axis support 32. In the present embodiment, the spin-axis 33 and the cam pin 27 are disposed coaxially to each other. The rear end of the arm-like lifter 34 is rotatably attached to the spin-axis 33.

The engagement pin 35 and the guide pin 36 are projectedly provided at the front end of the lifter 34 on the right and left sides in a coaxial manner. By engaging the guide pin 36 with the guide groove 81 of the guide member 80, whereby the lifter 34 is extendedly provided in the approximately longitudinal direction of the vehicle. The guide member 80 is installed into the groove 5j of the guide frame 5, as mentioned above, and the guide groove 81 includes a horizontal groove 81a1 and a sloped groove 81a2 that extends upward and forward from the front end of the horizontal groove 81a1, and accept the movement of the guide pin 36 around the spin-axis 33.

On the side wall face at the front portion of the rear panel slider 13 on the vehicle exterior side, there are provided an extended portion 38 extending approximately to the same level of the front end of the lifter 34, and a pin-restriction hole 39 that restricts the rotation of the engagement pin 35 in the vicinity of the front end of the extended portion 38. Note that the rotation of the lifter 34 can be restricted by the guide groove 81 through the guide pin 36, therefore, the pin-restriction hole 39 may be omitted if unnecessary. The extended portion 38 is projectedly provided with a spring-installation portion 40, on which a torsion spring 41 is fit. One end of the torsion spring 41 is locked to a lock portion 42 projectedly provided on the extended portion 38, and the other end thereof is locked to the lower end of the lifter 34. The torsion spring 41 turns and energizes the lifter 34 upward at all times.

There is provided, on the rear end of the driving slider 30, an engagement groove 43 that upwardly extends toward the front vehicle side and opens at the rear end thereof. By engaging or disengaging the engagement pin 35 with the engagement groove 43, the engaging-disengaging operations between the driving slider 30 and the rear panel slider 13 are carried out.

The anchor installation structure of the sliding roof system according to the present invention facilitates installing the anchor to the guide frame. By installing the anchor and the guide member into the identical groove, it is possible to save more space and utilize the saved space effectively.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A sliding roof for a vehicle comprising:
   a plurality of roof panels separately mounted on an opening of a fixed roof of the vehicle in a longitudinal direction of the vehicle;
   a guide frame attached at a lower portion of each side edge of the opening;
   an anchor installed into the guide frame to engage with at least part of the roof panel and to assist open-close operations of the plurality of the roof panels in the vicinity of a closed state thereof, wherein sliding of sliders attached to the each guide frame allows the plurality of the roof panels to open or close in the longitudinal direction of a vehicle;
   a guide member installed into the guide frame to guide a movement of engagement portions of the plurality of the roof panels adjacent in the longitudinal direction of the vehicle,
   wherein the anchor and the guide member are installed in pair into an identical groove formed on the guide frame,
   wherein the plurality of the roof panels include a front roof panel and a rear roof panel that are separated in the longitudinal direction of the vehicle, and mounted on the opening of the fixed roof of the vehicle, and the anchor is engaged with the front roof panel, and
   wherein the anchor includes a cam groove formed on a side end face thereof on the vehicle rear side, which is engaged with a stay boss formed at each rear side end of the front roof panel on the vehicle rear side, and is engaged with the sliders to slide along the guide frame in the longitudinal direction of the vehicle by the sliding of the sliders, moving along with the tilt-up or tilt-down operations of the front roof panel, and the cam groove is formed in a groove shape going along a movement locus of the stay boss moving along with the tilt-up or tilt-down operations of the front roof panel.

2. The sliding roof for a vehicle according to claim 1, wherein the stay boss comes into contact with an upper wall face of the cam groove of the anchor.

3. The sliding roof for a vehicle according to claim 1, wherein at least one of the anchor and the guide member further includes a projected portion formed on another side face thereof and configured to matingly engage correspondingly structured overhang portion of the groove formed on the guide frame.

* * * * *